(12) United States Patent
Brütt

(10) Patent No.: US 8,413,793 B2
(45) Date of Patent: Apr. 9, 2013

(54) CONTAINER CONVEYING SYSTEM FOR TRANSPORTING UNIT ITEMS, IN PARTICULAR BAGGAGE ITEMS

(75) Inventor: Jörn Brütt, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 5 days.

(21) Appl. No.: 12/727,449

(22) Filed: Mar. 19, 2010

(65) Prior Publication Data

US 2010/0236895 A1    Sep. 23, 2010

(30) Foreign Application Priority Data

Mar. 20, 2009 (DE) .......................... 10 2009 014 251

(51) Int. Cl.
*B65G 37/00*    (2006.01)

(52) U.S. Cl. ...................................... 198/619; 198/469.1

(58) Field of Classification Search .................. None
See application file for complete search history.

(56) References Cited

U.S. PATENT DOCUMENTS

| | | | | |
|---|---|---|---|---|
| 3,907,275 | A | * | 9/1975 | Bossons ........................ 271/69 |
| 4,101,020 | A | * | 7/1978 | Langen ...................... 198/469.1 |
| 4,722,341 | A | * | 2/1988 | Hedberg et al. ................. 607/14 |
| 4,722,431 | A | * | 2/1988 | Langen et al. ............. 198/459.8 |
| 5,467,718 | A | | 11/1995 | Shibata et al. |
| 6,321,896 | B1 | * | 11/2001 | Zuccheri et al. ........... 198/419.1 |
| 6,978,877 | B2 | * | 12/2005 | Spatafora et al. ......... 198/341.01 |

FOREIGN PATENT DOCUMENTS

| | | |
|---|---|---|
| DE | 20213326 U1 | 2/2003 |
| DE | 102007047000 A1 | 4/2009 |
| WO | 2009047177 A1 | 4/2009 |

* cited by examiner

*Primary Examiner* — Kavel Singh
(74) *Attorney, Agent, or Firm* — Laurence A. Greenberg; Werner H. Stemer; Ralph E. Locher

(57) ABSTRACT

A container conveying system for transporting baggage items in containers has at least one unloading station and/or a loading station for loading or unloading the container. The baggage item lies on an endless supporting belt which is guided transversely to the transporting direction of the container so as to be drivable about a deflection roller arranged on both sides of the container, wherein, for driving in the region of the loading and/or unloading station, a stationary drive is provided which is in operative connection during the loading and/or unloading operation with a drive element for the supporting belt that is provided on the container. In order to provide a drive design which is low-wear and guarantees a high degree of availability of the system, which minimizes the maintenance intervals and which represents a cost-effective alternative to prior solutions, it is proposed that in each case at least one planar field winding for generating an electric traveling field is installed as a stationary drive for the supporting belt in defined path segments. The field contactlessly drives an endlessly circulating runner element which is arranged on the container and which in turn is coupled in terms of gearing to the supporting belt.

15 Claims, 2 Drawing Sheets

FIG. 1
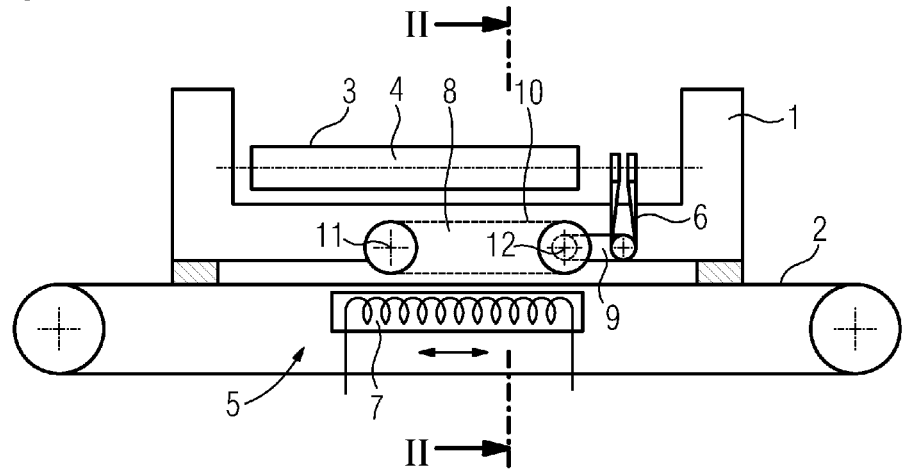
FIG. 2
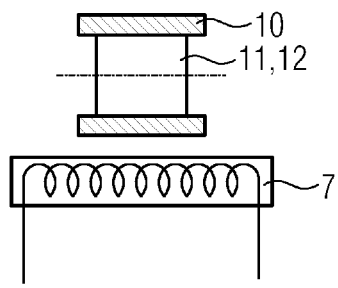
FIG. 3
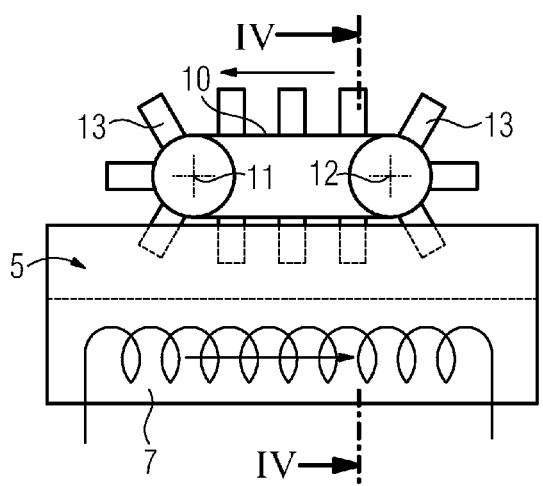
FIG. 4

CONTAINER CONVEYING SYSTEM FOR TRANSPORTING UNIT ITEMS, IN PARTICULAR BAGGAGE ITEMS

CROSS-REFERENCE TO RELATED APPLICATION

This application claims the priority, under 35 U.S.C. §119, of German application DE 10 2009 014 251.7, filed Mar. 20, 2009; the prior application is herewith incorporated by reference in its entirety.

BACKGROUND OF THE INVENTION

Field of the Invention

The invention relates to a container conveying system for transporting unit items, in particular pieces of baggage on a conveying track. The latter has supporting and guide elements for the containers and at least one unloading station for unloading the unit item from the container and/or at least one loading station for loading the container with the unit item. During transportation the unit item lies on an endless supporting belt which is guided transversely to the transporting direction of the container so as to be drivable about a deflection roller arranged on both sides of the container. In order to drive the supporting belt there is provided a stationary drive in the region of the loading and/or unloading station and, at least during the loading and/or unloading operation, is in operative connection with a drive element for the supporting belt that is provided on the container.

In order to transport any desired unit items, in particular baggage items, such as bags and cases, but also parcels, individually in a loading aid, for example in a container, in a positionally stable manner at high speed over a widely branched conveying system having many changes of direction and, on the other hand, to bring about a rapid and controlled loading or separation of unit item and container at predetermined positions within the conveying system, it is known practice to use conveying systems in which relatively simple containers formed from plastic are transported on a conveying track with supporting and guide elements for the container which preferably consist of mutually parallel endless circulating belts on which the containers lie. The loading is effected in such a way that the unit item falls into or slides into the container from above and a separation of the unit item and container is achieved in that the container is tilted transversely to the conveying direction.

The loading and in particular unloading devices which are necessary in order to tilt the unit item out of the containers necessarily require gravitational force, which in turn results in the unit item being subjected to extreme stress if it is removed laterally from the conveying system via chutes or is thrown into the containers during loading. It has therefore already been proposed to use the crossover conveyors known from sorting technology also for the transportation of baggage items. The crossover conveyors used in sorting technology usually consist of vehicles movable on a conveying system, a plurality of which are combined to form a train or an endlessly circulating vehicle chain. The individual vehicles are provided with a supporting belt which can be driven in circulation transversely to the transporting direction of the vehicles. The unit item is transported lying on the supporting belt and is laterally discharged at the desired unloading station by driving the crossbelt.

However, as a result of the dependency of the individual vehicles upon the laid conveying section, this type of conveying technology is very limited in its use and cannot be readily used, for example, in large airport systems involving great distances.

It has therefore already been proposed to use the known, above-described container technology in which passive containers are transported through the system on a conveying mechanism and are diverted and controlled by the system, and, to avoid damage to the unit item parts and to simplify the sorting technology, to provide the passive containers with a supporting belt similar to the above-described crossover conveyor technology. By driving the supporting belt in the region of the loading and/or unloading station, the unit item can be laterally removed from the conveying system without gravitational force having to be used. However, it is also necessary in that technology to drive the supporting belt in order to discharge the unit item from the conveyor. This takes place in the prior solution not, as in the case of crossover conveyors, by jointly transported motors, but by stationary drives which are provided in the region of the loading and/or unloading stations and which, at least during the loading and/or unloading operation, can be coupled to at least one drive element for the supporting belt that is provided on the container.

In the prior art, the coupling is effected by frictional or positive (i.e, form-locking) engagement. Thus, in one case, the drive element for the supporting belt that is provided on the container is designed as a toothed belt circulating endlessly about deflection wheels parallel to the transporting direction, one of the deflection wheels of which belt is operatively connected via an angular gear to one of the deflection rollers of the supporting belt. In the region of the loading and/or unloading station, the toothed belt engages positively in a stationarily arranged drivable second toothed belt endlessly circulating parallel to the first toothed belt, and the circulating speed and circulating direction of which second toothed belt are controllable.

Like the frictional connections, positive connections are also subject to a high degree of wear to an increased degree, with the result that the states in the system change during the course of the operation. In the case of diminishing frictional engagement, this means errors in the transmission of the drive torque and, in the case of worn positive (form-locking) parts, this means disruptions and the eventual failure of the system.

SUMMARY OF THE INVENTION

It is accordingly an object of the invention to provide a drive concept which overcomes the above-mentioned disadvantages of the heretofore-known devices and methods of this general type and which provides for a drive system that, because it is low-wear, leads to a high availability of the system, which minimizes the maintenance intervals and which represents a cost-effective alternative to prior solutions.

With the foregoing and other objects in view there is provided, in accordance with the invention, a container conveying system for transporting unit items, such as pieces of luggage. The system comprises:

a container and a conveying track having supporting and guide elements for said containers;

at least one unloading station for unloading the unit items from said container and/or at least one loading station for loading the unit items onto said container;

an endless supporting belt disposed on said container, guided transversely to a transport direction of said container, and drivable about deflection rollers disposed on said container, said supporting belt carrying the unit item during a transport thereof along the transport direction;

a stationary drive for driving said supporting belt in defined path segments at said loading station and/or said unloading station, said stationary drive including at least one planar field winding for generating an electric traveling field; and an endlessly circulating runner element disposed on said container and coupled to said supporting belt and configured to be contactlessly driven by said electric traveling field generated by said field winding for selectively loading the unit item onto said supporting belt at said loading station and/or unloading the unit item from said container at said unloading station.

In other words, the objects of the invention are achieved in that in each case at least one planar field winding for generating an electric traveling field is installed as a stationary drive for the supporting belt in defined path segments, which field contactlessly drives an endlessly circulating runner element which is arranged on the container and which in turn is coupled in terms of gearing to the supporting belt. The supporting belt is driven contactlessly in a manner analogous to electrical linear motors, with the result that virtually no wear is to be expected on the directly driven parts. Complicated mechanical connecting parts between the stationary drive and the drive on the container are dispensed with; as a result, maintenance work is minimized. Since the maintenance of the containers interferes with the system operation and complete failures of defective containers represent an intervention in the system operation which is absolutely to be avoided, the proposals of the invention result in a considerable advantage for the operator of the system.

According to a preferred feature of the invention, it is provided that the runner element is designed as an endless chain whose at least one chain strand is guided about deflection wheels by the traveling field at a slight distance from the field winding, and in that at least one of the deflection wheels driven by the chain is in geared connection with at least one of the deflection rollers of the supporting belt. The traveling field of the field winding thus drives the chain, which in turn, via the deflection wheels formed as chain wheels, drives the supporting belt via its deflection rollers.

Alternatively, it is also conceivable to design the runner element as a disk which can be driven about its horizontal axis of rotation which is oriented transversely to the active direction of the traveling field and which is in geared connection with the supporting belt, for which purpose a portion of the disk projects into the traveling field. In this alternative, too, the disk is drive-connected to at least one deflection roller.

Since the field winding must usually be oriented in the transporting direction and therefore the traveling field also runs parallel to the direction of movement, the drive torque must be deflected to the supporting belt extending transversely to the transporting direction. It is simplest according to the invention for the geared connection between the runner element and the supporting belt to take place via a belt or chain drive. However, it is also possible according to another embodiment of the invention to use an angular gear as geared connection between the runner element and supporting belt.

In accordance with an additional feature of the invention, the runner element designed as a chain is equipped with blades which are fixedly arranged on the chain members and which extend contactlessly into the traveling field of the field winding in the circulating plane of the chain. The blades form the runner of the linear drive and allow a sufficiently large transmission of force to the supporting belt charged with unit item.

To ensure that loading and unloading of the supporting belt is possible to both sides of the transport path, it is proposed that the direction of the traveling field and hence the running direction of the supporting belt are reversible.

Controlling the traveling field in its intensity and direction makes a flexible use of the drive system possible; according to the invention the traveling field can be activated independently of the transporting speed and the standstill of the container.

In another embodiment of the container conveying system, in order to achieve the object it is proposed that the at least one planar field winding provided as a stationary drive element for the supporting belt in the region of the loading and/or unloading station is arranged below the container to be loaded or unloaded and parallel to the running direction of the supporting belt, and the supporting belt can be driven by the direction-reversible traveling field via runner elements integrated into the supporting belt.

The supporting belt can be driven directly and contactlessly by way, for example, of runner elements which are integrated into the supporting belt, preferably in its edge region or margins, and which are in the form of ferromagnetic plates or magnets that are driven by the traveling field.

The invention provides a largely wear-free drive system for the supporting belt of a generic container conveying system whereby the availability of the system can be markedly increased by means of reduced mechanical problems and less maintenance work.

Other features which are considered as characteristic for the invention are set forth in the appended claims.

Although the invention is illustrated and described herein as embodied in a container conveying system for transporting unit items, in particular baggage items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows a highly schematic illustration of a container lying on a conveying track;

FIG. 2 shows a section through the container and the drive element taken along the section line II-II in FIG. 1;

FIG. 3 shows a particular design of a runner element according to the invention;

FIG. 4 shows a section taken along the section line IV-IV in FIG. 3;

DETAILED DESCRIPTION OF THE INVENTION

Figure 5:
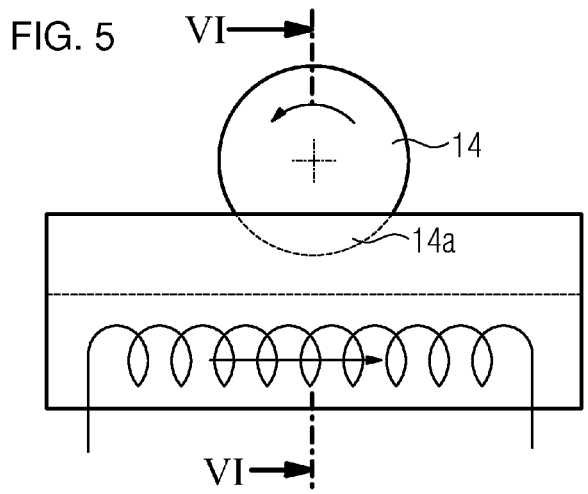
FIG. 5 shows the runner element designed as a disk.
Figure 6:
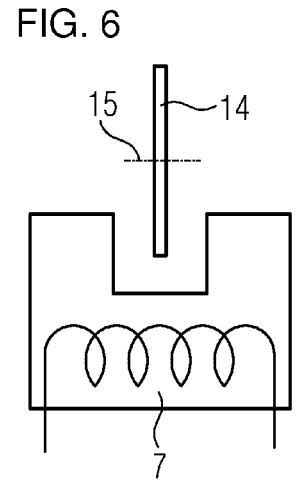
FIG. 6 shows a section through the runner element according to FIG. 5 taken along the section line VI-VI.

The figures of the drawing show a highly schematic illustration of a plurality of variants of the supporting belt drive of the containers in a container conveying system according to the invention. Referring now specifically to FIG. 1, the container which lies on the conveying track is designated by 1. The conveying track is formed by endlessly driven transport belts which are spaced apart parallel to one another and which can support the container lying on both sides and transport to the right or left (with reference to the drawing plane). Each of a plurality of containers is equipped with a supporting belt 3 which is endlessly guided transversely to the transporting direction of the container about the deflection rollers arranged on both sides of the container and which carries the unit item on its upper strand during the transport of the container. In loading or unloading stations, the unit item, for example airline baggage, is laterally removed in a controlled manner in that the supporting belt 3 is driven to circulate about the deflection rollers 4. Here, the unit item is moved (transversely to the drawing plane) from the container and captured at the removing station, for example on a chute. Conversely, the loading of the supporting belt 3 takes place starting from a loading station which delivers the unit item onto the supporting belt 3 set in motion in order to transport it into the center of the container 1 and to position it there for further transport after stopping the supporting belt 3.

In order to be able to drive the supporting belt 3 if required, i.e. essentially in the loading and unloading stations, drive elements are required by way of which the deflection rollers 4 can be set in rotation. The present invention proposes providing, as stationary drive 5 for the supporting belt 3, a planar field winding within the conveyor 2 which is oriented in such a way that it extends parallel to the transporting direction of the conveyor 2. This field winding is designated overall by 7. The field winding 7 generates a linearly moving traveling field by means of which a runner is moved, specifically likewise parallel to the transporting direction of the container 1. The principle is known from linear motors.

The runner element is designated by 8 in FIG. 1 and comprises a chain 10 which circulates endlessly about deflection wheels 11 and 12 and of which the chain lower strand is taken along by the traveling field of the field winding 7. When driving the lower strand of the chain in the running direction of the traveling field, the deflection wheels 11 and 12, which are preferably designed as chain wheels in engagement with the chain, are likewise driven. The drive torque is picked up from one of the deflection wheels, in the example the deflection wheel 12, via a belt drive 9 and transmitted in a deflecting manner to the deflection roller 4 of the supporting belt 3. In this way, the supporting belt 3 can be set in motion together with a unit item lying thereon, with the result that the unit item is laterally discharged. The formation and the control of the traveling field are chosen such that, both during a standstill of the container 1 and during its transportation on the conveyor 2, the supporting belt 3 can be driven in that the traveling field sets the chain of the runner element 7 in motion and, picked up therefrom, the deflection roller 4.

FIG. 2 shows a section through the arrangement according to FIG. 1 taken along the section line II-II. This schematic illustration shows one of the deflection wheels 11, 12 of the endless chain 10 and, likewise highly schematically, the field winding 7 in which the traveling field is generated.

FIG. 3 shows a variant of the drive in which the runner element 8 is likewise designed as a chain 10 which is endlessly guided via the deflection wheels 11 and 12, although the individual chain members are equipped with blades 13 which are arranged thereon and which in turn extend contactlessly into the traveling field of the field winding 7. The blades 13 of the circulating chain 10 are uniformly distributed over the chain strand and penetrate between the field winding 7, with the result that the traveling field can develop a large driving force on the chain via the blades 13. A cross section of this design of the chain is represented in FIG. 4 along the section line IV-IV from FIG. 3. The drive torque is transmitted from the chain 3 to the deflection rollers 4 of the supporting belt 3 either, as represented in FIG. 1, via belt drives 9 or via an angular gear (not shown). In both cases, the supporting belt 3 is driven via the chain 10 and its deflection wheel 11 or 12, with the drive energy being transmitted to the chain 10 via the traveling field generated by the field winding 7.

Another configuration of the drive is represented in FIG. 5. Here, the runner element comprises a disk 14 which extends by a segment 14a into the region of the traveling field of the field winding 7 and is driven thereby. The drive torque is picked up from the axis 15 of the disk 14 and transmitted via a geared connection (not shown) to the deflection roller 4 of the supporting belt 3. In all of the cases represented, the drive between the stationary drive 5 and the runner element 8 or 14 takes place contactlessly and hence wear-free.

Figure 7:
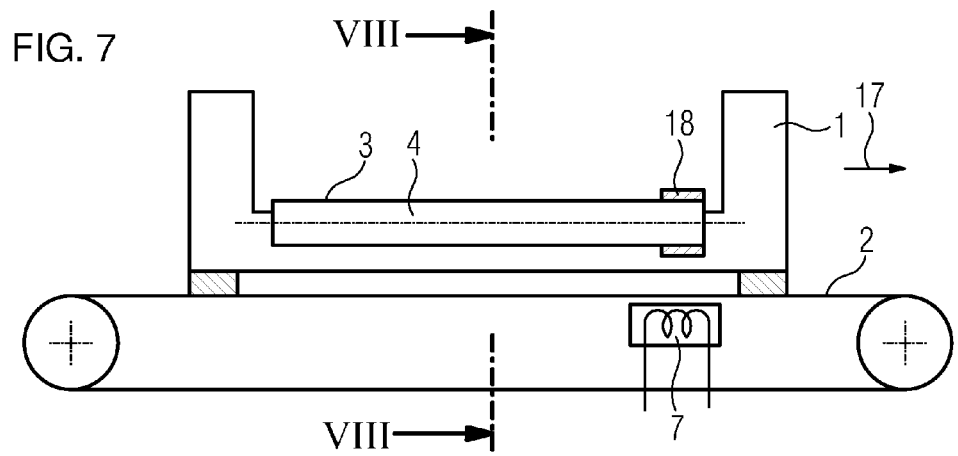
FIG. 7 shows a container lying on the conveying track with a variant of the contactless drive.

FIG. 7 shows a somewhat differently designed drive device whose field winding 16 is arranged below the container 1 in the conveyor 2 transversely to its transporting direction 17. The supporting belt 3 which is arranged on the container 1 and which, as in the other embodiments, is endlessly guided by the deflection rollers 4 is equipped in its edge region with runner elements 18 which are fixedly connected to the supporting belt 3 so as to be able to deflect via the deflection rollers 4 and are driven by the traveling field of the field winding 16 in such a way that the supporting belt 3 moves around the deflection rollers 4. At the loading and unloading station of the conveyor 2, the container 1 is positioned above the field winding 16 in such a way that the runner elements 18 of the supporting belt 3 pass into the region of the traveling field and are directly driven thereby. Here, too, the transmission of the drive torque takes place contactlessly, as in the case of a linear motor.

Figure 8:
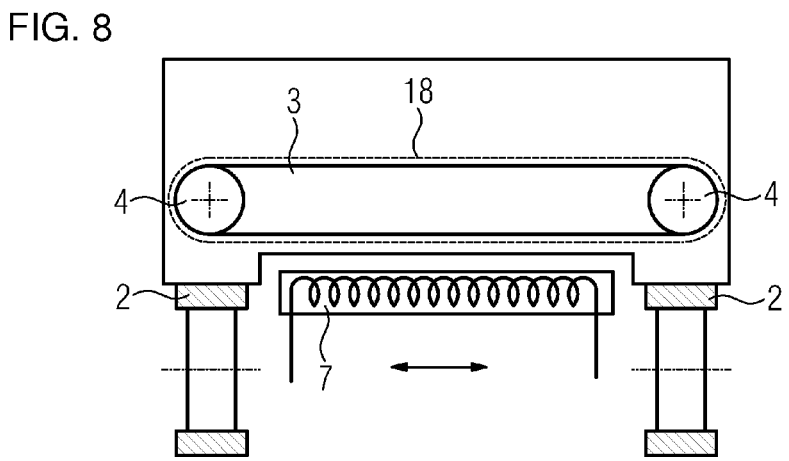
FIG. 8 shows a cross section through the container and the conveying track taken along the section line VIII-VIII in FIG. 7.

FIG. 8 shows a section through the arrangement according to FIG. 7 taken along the section line VIII-VIII. Identical parts are designated identically. The arrow 19 makes it clear that here, as also in the other arrangements, the traveling field is reversible in that the polarity of the field winding 7 is reversed. In this way, the supporting belt 3 can be driven in both directions, with the result that loading and unloading can take place from or to both sides of the conveyor 2.

The invention claimed is:

1. A container conveying system for transporting unit items, comprising:
   a container and a conveying track having supporting and guide elements for said containers;
   at least one unloading station for unloading the unit items from said container and/or at least one loading station for loading the unit items onto said container;
   an endless supporting belt disposed on said container, guided transversely to a transport direction of said container, and drivable about deflection rollers disposed on said container, said supporting belt carrying the unit item during a transport thereof along the transport direction;
   a stationary drive for driving said supporting belt in defined path segments at said loading station and/or said unloading station, said stationary drive including at least one planar field winding for generating an electric traveling field; and
   an endlessly circulating runner element disposed on said container and coupled to said supporting belt and configured to be contactlessly driven by said electric traveling field generated by said field winding for selectively loading the unit item onto said supporting belt at said loading station and/or unloading the unit item from said container at said unloading station.

2. The container conveying system according to claim 1, wherein said runner element is an endless chain having at least one chain strand guided about deflection wheels by the traveling field in a vicinity by spaced from said field winding, and wherein at least one of said deflection wheels driven by said chain is in geared connection with at least one of said deflection rollers of said supporting belt.

3. The container conveying system according to claim 1, wherein the electric traveling field has a defined active direction, said runner element is a disk rotatably driven about a horizontal axis of rotation oriented transversely to the active direction of the traveling field, said disk is in geared connection with said supporting belt, and a portion of said disk projects into the traveling field.

4. The container conveying system according to claim 3, wherein said geared connection between said runner element and said supporting belt is effected via a belt or chain drive.

5. The container conveying system according to claim 3, wherein said geared connection between said runner element and said supporting belt is effected via an angular gear.

6. The container conveying system according to claim 1, which comprises a belt or chain drive coupling said runner element to said supporting belt.

7. The container conveying system according to claim 1, which comprises an angular gear coupling said runner element to said supporting belt.

8. The container conveying system according to claim 1, wherein said runner element is a chain with blades fixedly arranged on chain members of said chain and extending contactlessly into the traveling field of said field winding in a circulating plane of said chain.

9. The container conveying system according to claim 1, wherein an operative direction of the traveling field is reversible and, as a consequence, a running direction of said supporting belt is reversible.

10. The container conveying system according to claim 1, wherein said traveling field is activatable independently of a transporting speed and a standstill of said container.

11. The container conveying system according to claim 1, wherein said at least one planar field winding forming said stationary drive element for said supporting belt at said loading station and/or unloading station is disposed below said container to be loaded or unloaded and parallel to a running direction of said supporting belt, and said supporting belt is driven by the direction-reversible traveling field via runner elements integrated into said supporting belt.

12. The container conveying system according to claim 11, wherein said runner elements integrated into said supporting belt are ferromagnetic plates or magnets which extend into the traveling field of said field winding.

13. The container conveying system according to claim 12, wherein said runner elements are integrated into marginal regions of said supporting belt.

14. The container conveying system according to claim 1, wherein said containers and said supporting belt are configured to transport pieces of luggage.

15. A container conveying system for transporting unit items, comprising:
  a container and a conveying track having supporting and guide elements for said containers;
  at least one unloading station for unloading the unit items from said container and/or at least one loading station for loading the unit items onto said container;
  an endless supporting belt disposed on said container, guided transversely to a transport direction of said container, and drivable about deflection rollers disposed on said container, said supporting belt carrying the unit item during a transport thereof along the transport direction;
  a stationary drive for driving said supporting belt in defined path segments at said loading station and/or said unloading station, said stationary drive including at least one planar field winding for generating an electric traveling field; and
  an endlessly circulating runner element disposed on said container and coupled to said supporting belt, said runner element and said field winding together forming a linear motor wherein said runner element is contactlessly driven by said electric traveling field generated by said field winding for selectively loading the unit item onto said supporting belt at said loading station and/or unloading the unit item from said container at said unloading station.

* * * * *